United States Patent
Bo et al.

(10) Patent No.: US 12,277,054 B2
(45) Date of Patent: Apr. 15, 2025

(54) LOGICAL ADDRESS ALLOCATION FOR SUBMISSION QUEUE ENTRY

(71) Applicant: Beijing Volcano Engine Technology Co., Ltd., Beijing (CN)

(72) Inventors: Shoujing Bo, Beijing (CN); Haixin Yu, Beijing (CN); Jiali Jiang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/731,034

(22) Filed: May 31, 2024

(65) Prior Publication Data

US 2024/0403209 A1    Dec. 5, 2024

(30) Foreign Application Priority Data

Jun. 1, 2023  (CN) .......................... 202310646550.X

(51) Int. Cl.
*G06F 12/02*  (2006.01)

(52) U.S. Cl.
CPC .. *G06F 12/0246* (2013.01); *G06F 2212/7201* (2013.01)

(58) Field of Classification Search
CPC ................ G06F 12/0246; G06F 2212/7201
See application file for complete search history.

(56) References Cited

U.S. PATENT DOCUMENTS

| | | | |
|---|---|---|---|
| 9,396,243 B1 * | 7/2016 | Halevi | G06F 3/0641 |
| 10,042,751 B1 * | 8/2018 | Veprinsky | G06F 3/061 |
| 10,628,342 B1 * | 4/2020 | Iyer | G06F 13/4282 |
| 2008/0104589 A1 * | 5/2008 | McCrory | G06F 9/45558 718/1 |

(Continued)

FOREIGN PATENT DOCUMENTS

| | | |
|---|---|---|
| CN | 108614671 A | 10/2018 |
| CN | 113467714 A | 10/2018 |
| WO | WO-2023115978 A1 * | 6/2023 |

OTHER PUBLICATIONS

Extended European Search Report for European Patent Application No. 24179310.8, mailed on Oct. 30, 2024, 9 pages.

*Primary Examiner* — Tasnima Matin
(74) *Attorney, Agent, or Firm* — Astute IP Law Group

(57) ABSTRACT

The disclosure provides a logical address allocation method, apparatus, electronic device and storage medium. The method includes: receiving a first request sent by a target virtual machine unit, the first request being used for registering a logical address of a submission queue entry of the target virtual machine unit; performing a hash operation based on the first request to obtain a first hash value indicating the submission queue entry; acquiring a target hash table corresponding to the target virtual machine unit, and querying the target hash table based on the first hash value to obtain a target hash bucket to which the first hash value belongs; acquiring, based on a hash bucket identification of the target hash bucket, a target logical address corresponding to the hash bucket identification from cur- (Continued)

rently available logical addresses; and registering the target logical address as a corresponding logical address to generate the submission queue entry.

18 Claims, 9 Drawing Sheets

(56) References Cited

U.S. PATENT DOCUMENTS

| | | |
|---|---|---|
| 2014/0282514 A1* | 9/2014 | Carson ................ G06F 9/45533 718/1 |
| 2020/0136996 A1 | 4/2020 | Li et al. |
| 2020/0192819 A1 | 6/2020 | Nair et al. |
| 2020/0201692 A1* | 6/2020 | Kachare .................. G06F 9/545 |
| 2021/0294507 A1 | 9/2021 | Pinto |

* cited by examiner

LOGICAL ADDRESS ALLOCATION FOR SUBMISSION QUEUE ENTRY

CROSS REFERENCE TO RELATED APPLICATIONS

This Application claims priority to Chinese Patent Application No. 202310646550.X, entitled "LOGICAL ADDRESS ALLOCATION METHOD, APPARATUS, ELECTRONIC DEVICE AND STORAGE MEDIUM" and filed on Jun. 1, 2023, the disclosure of which is incorporated herein by reference in its entirety.

FIELD

Embodiments of the present disclosure relate to the field of data storage technologies, and in particular, to a logical address allocation method, apparatus, electronic device and storage medium.

BACKGROUND

Device virtualization plays a very important role in cloud computing development. In the prior art, when providing storage space for a virtual machine unit via a storage medium of one or more non-volatile memory controller interface standard (NVM Express, NVMe), a central processor distributed processing unit (Data Processing Unit, DPU) manages logical addresses of a plurality of virtual machine units uniformly based on a chain table, to realize a logical mapping from a virtual machine to the storage medium.

However, the solution of allocating a logical address of a virtual machine unit through a chain table in the prior art has the problems of low efficiency and high resource occupation.

SUMMARY

Embodiments of the present disclosure provide a logical address allocation method, apparatus, electronic device and storage medium, so as to overcome problems of low efficiency and high resource occupation in a logical address allocation process.

According to a first aspect, an embodiment of the present disclosure provides a logical address allocation method, including:
receiving a first request sent by a target virtual machine unit, the first request being used for registering a logical address of a submission queue entry of the target virtual machine unit; performing a hash operation based on the first request to obtain a first hash value indicating the submission queue entry; acquiring a target hash table corresponding to the target virtual machine unit, and querying the target hash table based on the first hash value to obtain a target hash bucket to which the first hash value belongs; acquiring, based on a hash bucket identification of the target hash bucket, a target logical address corresponding to the hash bucket identification from currently available logical addresses; and registering the target logical address as a corresponding logical address to generate the submission queue entry.

According to a second aspect, an embodiment of the present disclosure provides an apparatus for allocating a logical address, including:
a receiving module configured to receive a first request sent by a target virtual machine unit, the first request being used for registering a logical address of a submission queue entry of the target virtual machine unit;
a calculation module configured to perform a hash operation based on the first request to obtain a first hash value;
a first allocation module configured to acquire a target hash table corresponding to the target virtual machine unit, and query the target hash table based on the first hash value to obtain a target hash bucket to which the first hash value belongs; and
a second allocation module configured to acquire, based on a hash bucket identification of the target hash bucket, a target logical address corresponding to the hash bucket identification from currently available logical addresses, and register the target logical address as a corresponding logical address to generate the submission queue entry.

According to a third aspect, an embodiment of the present disclosure provides an electronic device, including:
a processor and a memory communicatively connected to the processor; and
the memory stores computer execution instructions;
the processor executes the computer execution instructions stored in the memory to implement the method for logical address allocation described in the foregoing first aspect and various possible designs in the first aspect.

According to a fourth aspect, an embodiment of the present disclosure provides a computer readable storage medium. The computer readable storage medium stores computer execution instructions. When a processor executes the computer execution instructions, the logical address allocation method according to the first aspect and various possible designs of the first aspect is implemented.

According to a fifth aspect, an embodiment of the present disclosure provides a computer program product, including a computer program. When the computer program being executed by a processor, implements the logical address allocation method according to the foregoing first aspect and various possible designs of the first aspect.

Embodiments of the present disclosure provide a logical address allocation method, apparatus, electronic device and storage medium. The method includes receiving a first request sent by a target virtual machine unit, the first request being used for registering a logical address of a submission queue entry of the target virtual machine unit; performing a hash operation based on the first request to obtain a first hash value indicating the submission queue entry; acquiring a target hash table corresponding to the target virtual machine unit, and querying the target hash table based on the first hash value to obtain a target hash bucket to which the first hash value belongs; acquiring, based on a hash bucket identification of the target hash bucket, a target logical address corresponding to the hash bucket identification from currently available logical addresses; and registering the target logical address as a corresponding logical address to generate the submission queue entry. Obtaining the first hash value representing the submission queue entry by responding the first request to perform the hash calculation, and mapping to the target hash bucket based on the first hash value, mapping the target hash bucket to the target logical address corresponding to the submission queue entry in sequence. As searching the table based on hash mapping is more efficient than searching the chain table, and does not need to consume extra storage space to store the chain table data. Therefore, the logic address of the submission queue entry is registered quickly, and the allocation efficiency of the logic address is improved, reducing resource occupation in a logic address allocation process.

BRIEF DESCRIPTION OF THE DRAWINGS

In order to more clearly illustrate the technical solutions in the present application or the prior art, a brief introduction is given below to the accompanying drawings to be used in the description of the embodiments or the prior art. It is obvious that the accompanying drawings in the following description are some embodiments of the present application, and those of ordinary skill in the art may further obtain other figures according to these accompanying drawings without the exercise of any inventive skill.

DETAILED DESCRIPTION

To make the objectives, technical solutions and advantages of the present application clearer, the technical solutions in the present application will be described clearly and completely below conjunction with the accompanying drawings. It is obvious that the embodiments described here are a part rather than all of the embodiments in the present application. Based on the embodiments in the present application, all other embodiments obtained by those of ordinary skill in the art without the exercise of any inventive skill fall within the protection scope of the present application.

It should be noted that, user information (including but not limited to user equipment information, user personal information, and the like) and data (including but not limited to data used for analysis, stored data, displayed data, and the like) involved in the present disclosure is information and data which is authorized by a user or sufficiently authorized by each party, and collection, usage and processing of relevant data need to comply with relevant legal regulations and standards of relevant countries and regions. A corresponding operation entry is provided for the user to select authorization or rejection.

Figure 1:
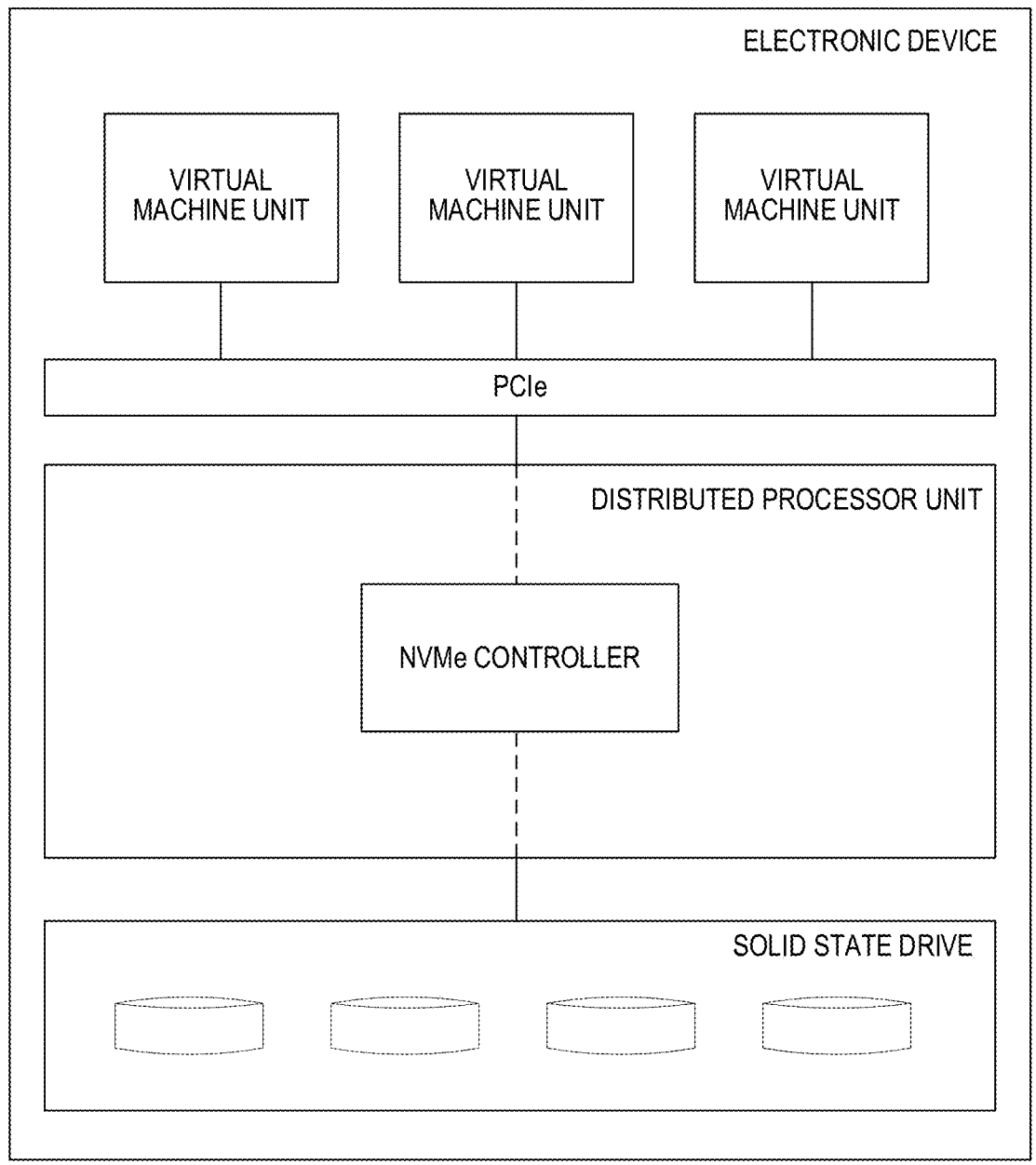
FIG. 1 is an application scenario diagram of a method for allocating a logical address according to an embodiment of the present disclosure.

Application scenarios of embodiments of the present disclosure will be explained below:

FIG. 1 is an application scenario diagram of a logical address allocation method provided in an embodiment of the present disclosure. The logical address allocation method provided in the embodiment of the present disclosure may be applied to application scenarios such as distributed computing, virtual machine management, and running. Specifically, the method provided by embodiments of the present disclosure can be applied to a central processing unit distributed processing unit (DPU, hereinafter distributed processing unit for short) or an electronic device including the distributed processing unit, such as a virtual machine server. Referring to FIG. 1, a distributed processing unit and a solid state disk (Solid State Disk, SSD) are disposed in an electronic device. One end of the distributed processing unit communicates with a plurality of virtual machine units (software units) through a high-speed serial computer interconnect express (PCIe) interface, the other end communicates with a solid state disk based on an NVMe protocol, in which a distributed processing unit comprises an NVMe controller. The logical address of the virtual machine unit is managed and allocated by using the NVMe controller, thereby implementing mapping between the virtual machine unit and the solid state disk. In this way, the solid state disk provides an independent storage medium for a plurality of virtual machine units, thereby implementing flexible configuration of the virtual machine units.

In the prior art, with regard to each virtual machine unit, an NVMe controller allocates a corresponding logical address thereto, wherein specifically, each virtual machine unit corresponds to a namespace, and each namespace can apply for a pre-set number of logical addresses at most. When N virtual machine units are running, the NVMe controller needs to maintain N chain tables to store address information in a corresponding namespace. After that, when the NVMe controller receives a submission queue entry (Submission Queue Entries, SQE) for a read or write instruction, the NVMe controller allocates a logical address to the submission queue entry, and the mapping to the physical storage medium may be realized through the logical address, thereby realizing the execution of the corresponding read/write instruction. However, in a practical application process, the solution of allocating an address to a submission queue entry by means of a chain table has low efficiency due to the special effect of the chain table itself and searching for a corresponding logic address by means of the chain table, and maintenance of the chain table needs to consume a large amount of storage resources, thereby causing problems of low local allocation efficiency and high resource occupation. An embodiment of the present disclosure provides a method for allocating a logical address to solve the above problem.

Figure 2:
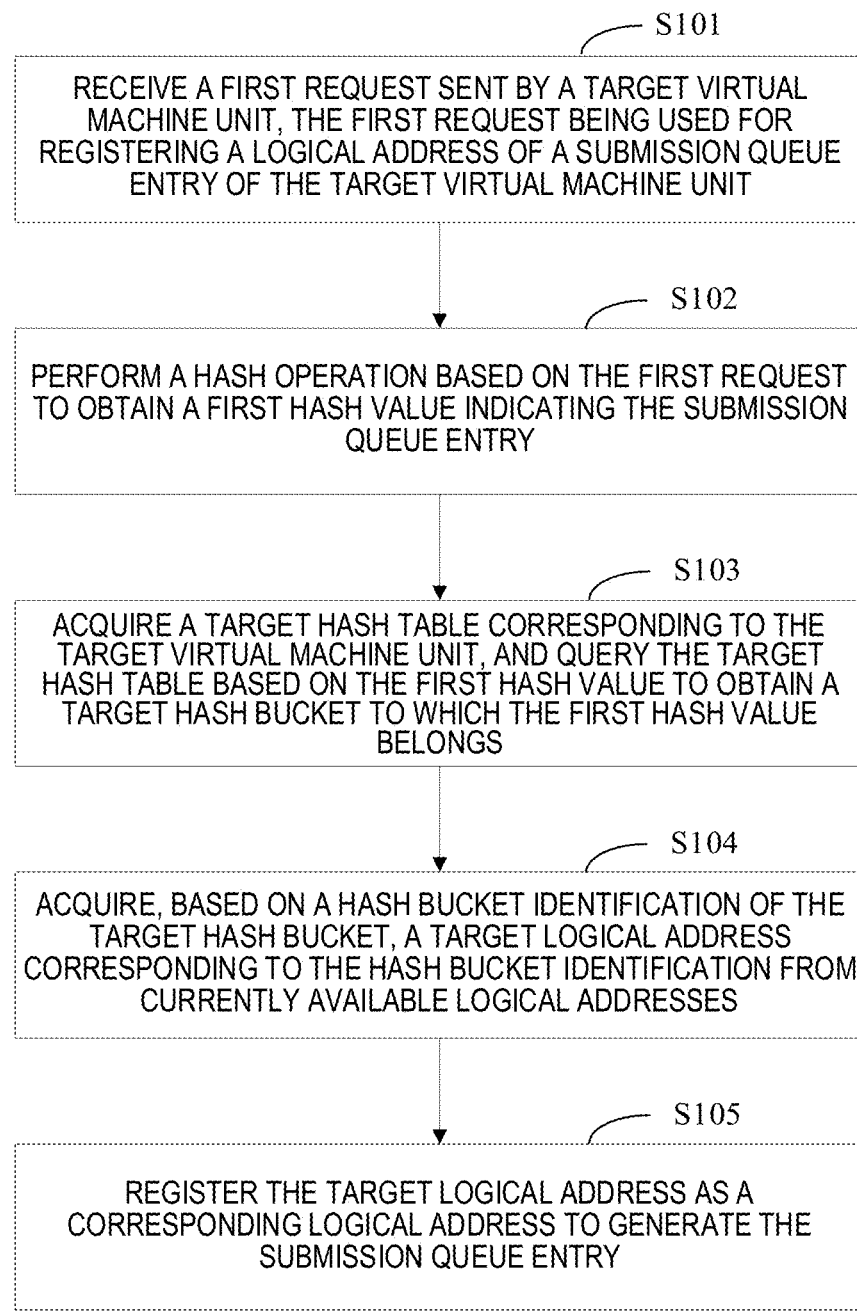
FIG. 2 is a first schematic flowchart of a method for allocating a logical address according to an embodiment of the present disclosure.
Figure 3:
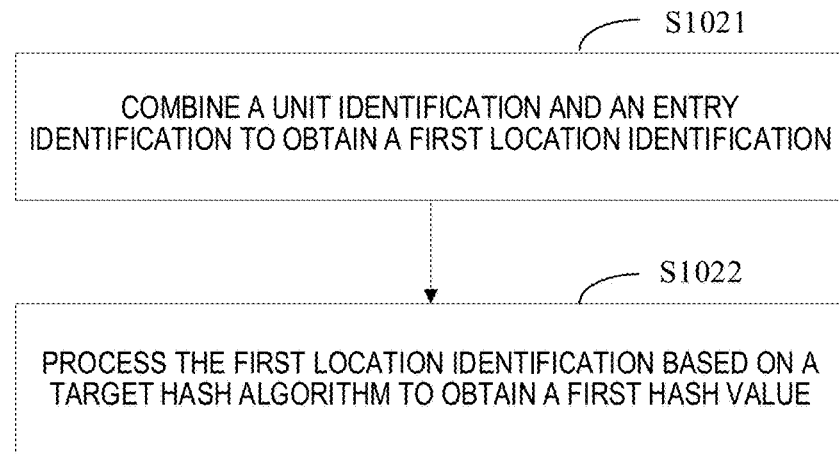
FIG. 3 is a flowchart of a specific implementation manner of step S102 in the embodiment shown in FIG. 2.

Referring to FIG. 2, which is a first schematic flowchart of a method for allocating a logical address according to an embodiment of the present disclosure. The method in this embodiment can be applied to a distributed processing unit or an electronic device comprising the distributed processing unit. The logical address allocation method comprises:

Step S101: receiving a first request sent by a target virtual machine unit, where the first request is used for registering a logical address of a submission queue entry of the target virtual machine unit.

Exemplarily, an execution body of the method provided in this embodiment may be a discrete processing unit chip, or a device including the discrete processing unit chip, for example, a network card device, which is referred to as discrete processing unit for short in this embodiment. Referring to the schematic diagram of the application scenario shown in FIG. 1, a target virtual machine unit is one of a plurality of virtual machine units in communication connection with a discrete processing unit. The virtual machine unit refers to a virtual machine program, a computing thread, a computing unit, or the like running in the same electronic device or a plurality of electronic devices. The virtual machine unit may independently execute the operation instructions through the allocated computing core, thread, memory, and storage space.

Further, when a target virtual machine needs to execute, for example, a read/write instruction, a corresponding logical address needs to be created and registered for the instruction, thereby implementing mapping of an application layer instruction to a physical layer, wherein the execution of the read/write instruction is implemented by using a submission queue (Submission Queue, SQ) and a completion queue (Completion Queue, CQ). The distributed processing unit creates the described submission queue and completion queue in the memory via the NVMe controller, and the read/write instruction sent by the virtual machine unit to the sending storage medium will be stored in the submission queue, and then the storage medium obtains the described read/write instruction from the submission queue. After that, after the storage medium finishes executing the read/write instruction, the executed read/write instruction is stored in the completion queue, and the virtual machine unit may determine, by reading information in the completion queue, that the previously sent read/write instruction has been executed. Herein, an element (instruction information) located in the submission queue is a submission queue entry (Submission Queue Entry). The element (instruction information) located in the completion queue is a completion queue entry (completion queue entry). Specific implementations of the submission queue, the completion queue, the submission queue element, and the completion queue element are known to those skilled in the art, and are not described herein again.

Further, when the virtual machine unit needs to execute a read/write instruction, the virtual machine unit may send a first request to the distributed processing unit, so as to request the distributed processing unit to register a corresponding logical address for a submission queue entry for executing the read/write instruction. Herein, for each virtual machine unit, the logical address owned by each virtual machine unit is limited, for example, the corresponding logical address for the virtual machine unit A comprises addr_0 to adrr_255. That is, the virtual machine unit A has at most 256 usable logical addresses in total, and when the virtual machine unit executes a read/write instruction, one of the 256 usable logical addresses may be registered as a logical address of a submission queue entry. Then, mapping is performed based on the logical address and the information in the entry of the submission queue, so as to obtain the corresponding disk physical address, thereby completing the execution of the read/write instruction. This process is described in detail in subsequent steps.

Step S102: performing a hash operation based on the first request to obtain a first hash value, where the first hash value is used to indicate a submission queue entry.

Exemplarily, after the distributed processing unit obtains the first request, a hash operation is performed based on identification information that is carried in the first request and represents a submission queue entry of the target virtual machine unit, so as to obtain a hash value, that is, a first hash value for indicating the submission queue entry.

Figure 4:
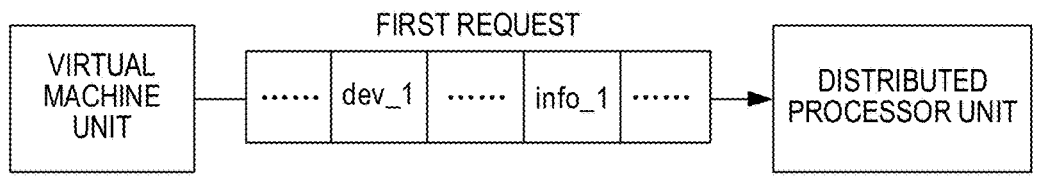
FIG. 4 is a schematic diagram of a data structure of a first request according to an embodiment of the present disclosure.

FIG. 4 is a schematic diagram illustrating a data structure of a first request according to an embodiment of the present disclosure. At the location of the d1 field of the first request, a unit identification dev_1 (shown as dev_1) of the virtual machine unit is stored. At the location of the d2 field of the first request, an entry identification info_1 (shown as info_1 in the figure) of a submission queue entry is stored. Further, exemplarily, the entry identification info_1 may be a unique identification code generated for the submission queue entry based on system time, or a collection of the foregoing information such as the operation type, the data length, and the start disk address corresponding to the entry of the submission queue. The unit identification dev_1 in the location of the d1 field and the entry identification info_1 in the location of the d2 field are combined, for example, the character corresponding to the dev_1 and the character corresponding to the info_1 are spliced to obtain the first location identification [dev_1, info_1]. Of course, in other possible implementations, the first location identification may be further generated in combination with other information. For example, reference information info_2 of a location of a d3 field (not shown in the figure) is further combined to generate the first location identification [dev_1, Info_1, Info_2], thereby realizing more accurate representation of a submission queue entry. Then, the first location identification is used as a hash input value (namely, a key value) to perform a hash operation (which is shown as hash(pos_1) in the figure), and an obtained hash operation result is the first hash value.

Step S103: acquiring a target hash table corresponding to the target virtual machine unit, and querying the target hash table based on the first hash value to obtain a target hash bucket to which the first hash value belongs.

Step S104: acquiring, based on a hash bucket identification of the target hash bucket, a target logical address corresponding to the hash bucket identification from currently available logical addresses.

Exemplarily, after receiving the first request sent by the target virtual machine unit, hash calculation is performed based on identification information in the first request to obtain a first hash value, and then a location of the first hash value is determined by querying the target hash table. Specifically, first, the target hash table corresponding to the target virtual machine unit is determined according to a unit identification indicating the target virtual machine unit in the first request, where each virtual machine unit corresponds to one hash table. A unique hash table, that is, a target hash table, may be obtained based on the unit identification and a preset mapping relationship. The target hash table represents a mapping relationship between a virtual machine unit and a corresponding hash bucket, that is, represents a mapping relationship between a unit identification of a virtual machine unit and a hash bucket identification of a target hash bucket. The hash bucket identification represents a target hash bucket to which the first hash value belongs, the hash bucket is a set of a group of hash values, and the target hash bucket is a hash bucket containing the first hash value. Further, a hash bucket is a data structure constituted by a plurality of hash slots, and a hash value is stored by means of the hash slots in the hash bucket, thereby realizing a many-to-one hash mapping relationship, so that the plurality of hash values are mapped to the same logical address.

Further, after querying the target hash table by using the first hash value, the target hash bucket is obtained. Then, from currently available logical addresses, based on a hash bucket identification of the target hash bucket, an available logical address, that is, a target logical address, is allocated for the target hash bucket.

Step S105: registering the target logical address as a corresponding logical address to generate the submission queue entry.

Exemplarily, further, after the target logical address is obtained, the target logical address is registered as the target logical address of the submission queue entry, realizing logic fast address allocation of a submission queue entry corresponding to the first request. On one hand, by means of hash calculation, after the first hash value is obtained, based on the first hash value, the uniqueness of the target logical address corresponding to the submission queue entry can be ensured (without hash collision). Thus, the target logical address is ensured to be valid. On the other hand, the distributed processing unit can rapidly obtain the logic address corresponding to the first hash value by means of querying a hash table, thereby achieving the purpose of rapidly and efficiently allocating a target logic address for a submission queue entry. Compared with the solution of using a form of chain table to allocate a logic address in the prior art, the solution can effectively improve the address allocation efficiency and reduce the storage space occupation.

In this embodiment, receiving a first request sent by a target virtual machine unit, the first request being used for registering a logical address of a submission queue entry of the target virtual machine unit; performing a hash operation based on the first request to obtain a first hash value indicating the submission queue entry; acquiring a target hash table corresponding to the target virtual machine unit, and querying the target hash table based on the first hash value to obtain a target hash bucket to which the first hash value belongs; acquiring, based on a hash bucket identification of the target hash bucket, a target logical address corresponding to the hash bucket identification from currently available logical addresses; and registering the target logical address as a corresponding logical address to generate the submission queue entry. Since the hash value-based table lookup method is more efficient than the chain table query method, and no additional storage space is required to store the linked list data, therefore, the logical address of the submission queue entry is registered quickly. Thus, the allocation efficiency of the logical address is improved, and the resource occupation in the process of allocating the logical address is reduced.

Figure 5:
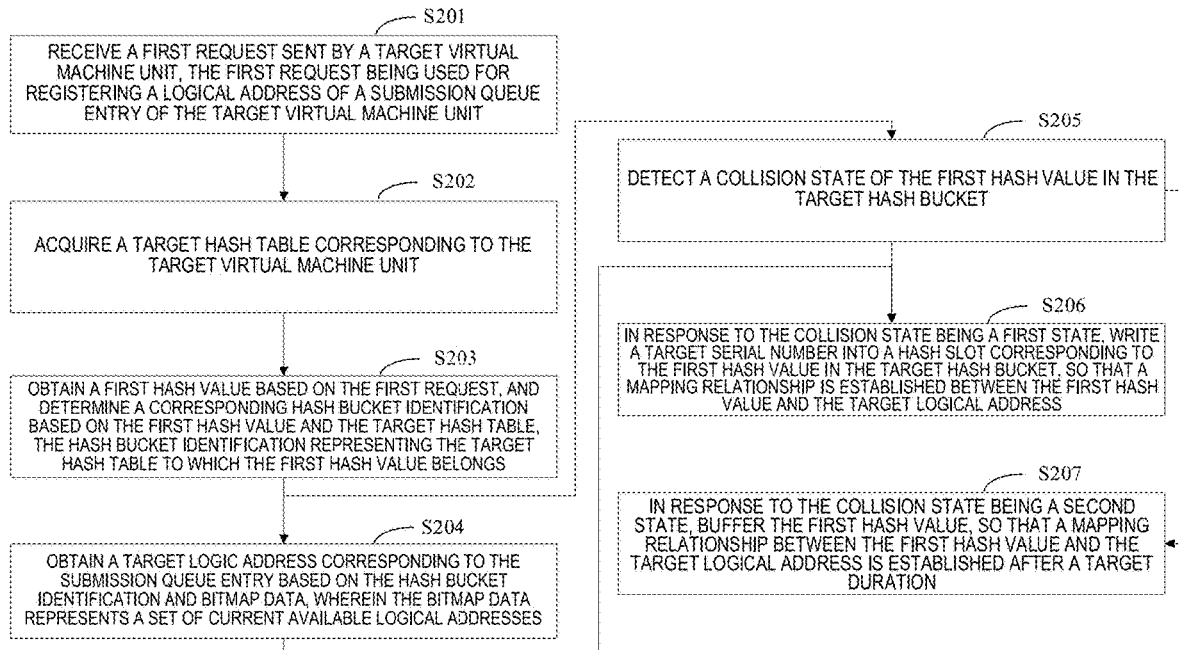
FIG. 5 is a second schematic flowchart of a method for allocating a logical address according to an embodiment of the present disclosure.

Referring to FIG. 5, which is a second schematic flowchart of a logical address allocation method according to an embodiment of the present disclosure. In this embodiment, on the basis of the embodiment shown in FIG. 2, step S103 is further refined, and the logical address allocation method includes:

Step S201: receiving a first request sent by a target virtual machine unit, where the first request is used for registering a logical address of a submission queue entry of the target virtual machine unit.

Step S202: acquiring a target hash table corresponding to the target virtual machine unit.

Step S203: obtaining a first Hash value based on the first request, and determining a corresponding hash bucket identification based on the first hash value and a target hash table, where the hash bucket identification represents a target hash bucket to which the first hash value belongs.

Exemplarily, with reference to relevant steps in the embodiment shown in FIG. 2, after receiving the first request sent by the target virtual machine unit, hash calculation is performed based on the identification information in the first request, and the table is looked up. Specifically, first, a target hash table corresponding to the target virtual machine unit is determined according to a unit identification indicating the target virtual machine unit in the first request, where each virtual machine unit corresponds to one hash table. A unique hash table, that is, a target hash table, may be obtained by using a unit identification and a preset mapping relationship. The target hash table represents a mapping relationship between a virtual machine unit and a corresponding hash bucket, that is, represents a mapping relationship between a unit identification of a virtual machine unit and a hash bucket identification of a target hash bucket. The hash bucket identification represents a target hash bucket to which the first hash value belongs, the hash bucket is a set of a group of hash values, and the target hash bucket is a hash bucket containing the first hash value. The hash bucket is a data structure formed by a plurality of hash slots, and each hash value is mapped to a logical address by using hash values stored in the plurality of hash slots in the hash bucket.

Figure 6:
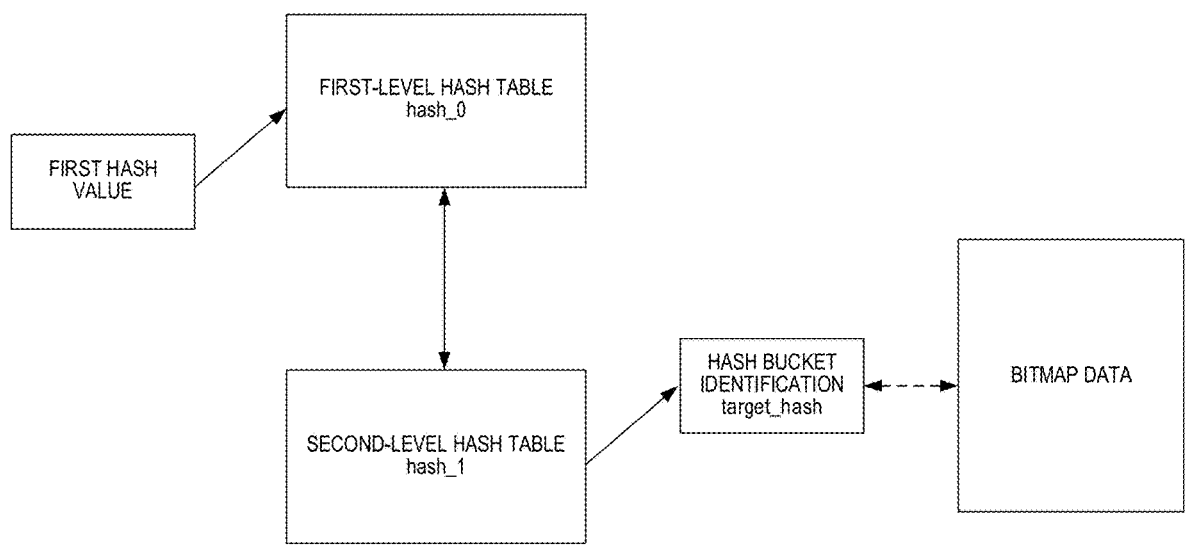
FIG. 6 is a schematic diagram of a process for determining a hash bucket identification according to an embodiment of the present invention.

In a possible implementation, the target hash table is a multilevel hash table, which comprises at least a first-level hash table and a second-level hash table. The target hash table is queried according to the first hash value corresponding to the first request, and then hash mapping is performed at least twice, so that a corresponding hash bucket identification is obtained, thereby further reducing hash collisions. FIG. 6 is a schematic diagram of a process for determining a hash bucket identification according to the present disclosure. As shown in FIG. 6, a target hash table includes a first-level hash table hash_0 and a second-level hash table hash_1. The first-level hash table hash_0 is firstly queried based on the first hash value, and the second-level hash table hash_1 corresponding to the first-level hash table hash_0 passes through. In this way, a corresponding Hash bucket identification target_hash is obtained, and then a corresponding target logical address is obtained from bitmap data by using the Hash bucket identification target_hash. The concept and implementation manner of the multi-level hash table are the prior art, and are not described herein again.

Step S204: obtaining, based on the hash bucket identification and bitmap data, a target logical address corresponding to a submission queue entry, where the bitmap data represents a set of currently available logical addresses.

Exemplarily, further, according to the hash bucket identification, bitmap data (bitmap) corresponding to the hash bucket identification is read, where the bitmap data is a sequence formed by binary numerals (0 and 1) or Boolean values (True and False). By using bitmap data, description of a current set of available logical addresses may be implemented, for example, a binary numeral 0 indicates that a preset logical address is occupied, that is, a logical address corresponding to the 0 position is an unavailable address; A binary numeral 1 indicates that a preset logical address is not occupied, that is, a logical address corresponding to the 1 position is an available address, and more specifically, for example, a logical address corresponding to the 1 position is an available address. An 8-bit bitmap data is [00000111]. According to the bitmap data, it can be seen that five logical addresses corresponding to the second numeral 0 are occupied, and three logical addresses corresponding to the second numeral 1 are not occupied. Therefore, the bitmap data realizes the function of recording (an index of) an available logical address, and afterwards, an available logical address, i. e. a target logical address, is obtained from the bitmap data corresponding to the hash bucket identification as a query response to the first hash value (the corresponding first request), thereby realizing the allocation of the logical address of the submission queue entry of the target virtual machine unit.

Exemplarily, bitmap data is composed of binary numerals of target bits, and a specific implementation manner of step S204 comprises:

Step S2041: detecting a target serial number of a first target binary numeral in the bitmap data.

Step S2042: obtaining a target logical address according to the target serial number and the hash bucket identification.

Figure 7:
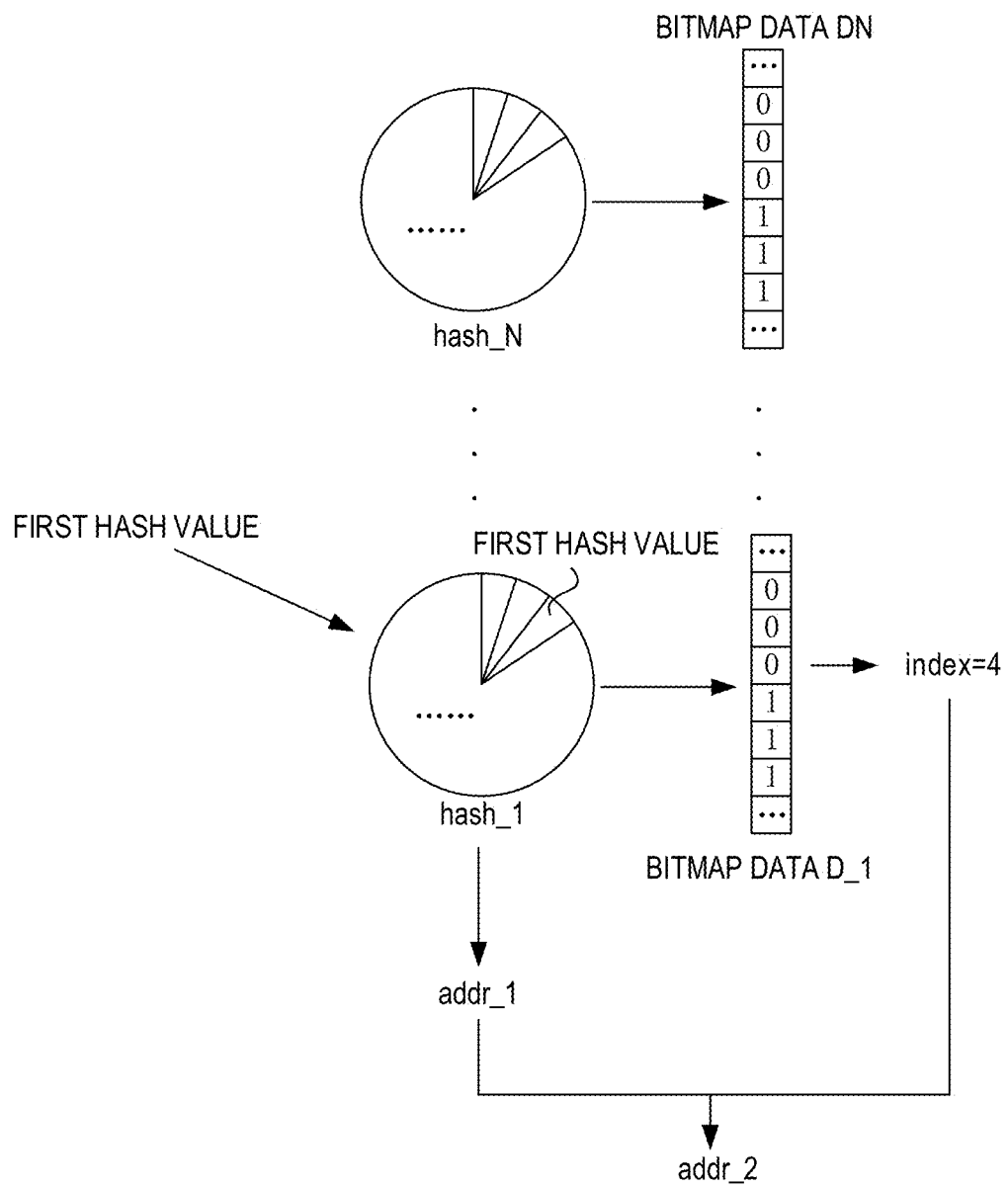
FIG. 7 is a schematic diagram of bitmap data according to an embodiment of the present disclosure.

Exemplarily, FIG. 7 is a schematic diagram of bitmap data provided in an embodiment of the present disclosure, and the foregoing process will be described in detail below with reference to FIG. 7. As shown in FIG. 7, exemplarily, N hash buckets are stored in a distributed processor unit, and corresponding hash bucket identifications are hash_1 to hash_N respectively. Each Hash bucket (or Hash bucket identification) corresponds to bitmap data also stored in the distributed processor unit, bitmap data D_1 to bitmap data D_N. After obtaining a hash bucket identification hash_1 according to the first hash value, obtain corresponding bitmap data D_1 based on the hash bucket identification hash_1, the content in the bitmap data D_1 being [00011], in which a binary numeral "1" represents an occupied logical address; a binary numeral "0" represents an unoccupied logic address, in which a target binary number is used for indicating the availability of a logic address. In the present embodiment, the target binary numeral refers to 0, and then a target serial number index of the first target binary number is detected from right to left, i. e. index=4. Further, a head address addr_1 of one logical address is determined according to the hash bucket identification hash_1, and then a final target logical address is obtained as addr_2=addr_1+index according to the target serial number index and serving as an address offset. Definitely, it is to be understood that the foregoing specific implementation of obtaining the target logical address according to the target serial number and the Hash bucket identification is only exemplary, and a specific implementation may be set according to requirements on the basis of obtaining the target serial number and the Hash bucket identification, which is not repeatedly described herein.

In the steps of the present embodiment, since the volume of bitmap data is smaller, and a target logical address is calculated twice based on an index corresponding to a target binary numeral provided by the bitmap data, there is no need to store location information about a logical address in the bitmap data, thereby further reducing the occupation of storage space, improving the query efficiency, and reducing the occupation of storage space.

Optionally, in another possible implementation manner, after step S203, the method further includes:

Step S205: detecting a collision state of the first hash value in the target hash bucket.

Step S206: if the collision state is a first state, writing the target serial number into a hash slot corresponding to the first hash value in the target hash bucket, so that a mapping relationship is established between the first hash value and the target logical address.

Step S207: if the collision state is a second state, buffering the first hash value, so that a mapping relationship is established between the first hash value and the target logical address after a target duration.

Exemplarily, after the first hash value is obtained, a collision state corresponding to the first hash value is determined, that is, if the first hash value is already included in the target hash bucket. Specifically, if the first hash value is not included in the target hash bucket, the first hash value does not conflict, that is, the collision state is a first state. If the target Hash bucket already includes the first Hash value, the first Hash value conflicts, that is, the collision state is the second state.

Further, the Hash bucket is formed by a Hash slot, and the Hash slot is a data structure for storing the first Hash value. If the collision state is the first state, that is, the first hash value is not stored in the hash slot, the target logical address obtained through the foregoing step S204 is written into the hash slot corresponding to the first hash value. The record of the mapping relation of "the first hash value-the target logical address" is completed, that is, the corresponding target logical address is allocated to the submission queue entry. After that, when the submission queue entry is really executed, a corresponding target logical address may be obtained by querying the target Hash bucket, thereby realizing a read-write instruction corresponding to the submission queue entry. On the other hand, if the collision state is the second state, that is, the first hash value is stored in the hash slot, indicating that in the target hash bucket, a target logical address indexed by the first hash value has been stored. In this case, because the logical address corresponding to the first hash value is occupied, the target logical address cannot be immediately allocated to the submission queue entry corresponding to the first request. In this case, the first hash value is buffered to the memory, which is equivalent to suspending this first request, after a pre-set duration or after receiving a trigger instruction. After the occupied logical address is released, the first request is responded to again, and the foregoing steps of this embodiment are re-executed, until the target logical address is written into the target Hash bucket, completing the allocation of the logical address of the submission queue entry corresponding to the first request.

Figure 8:
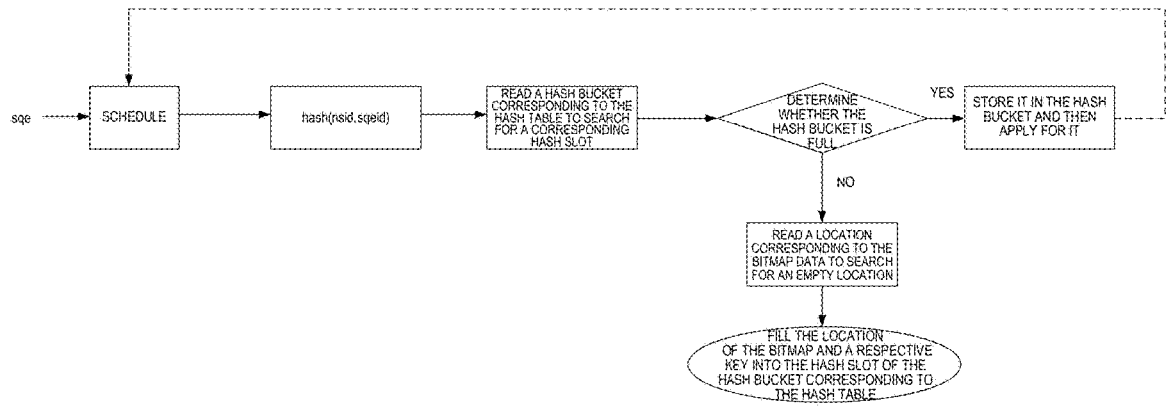
FIG. 8 is a schematic diagram of a process of processing a submission queue entry according to an embodiment of the present disclosure.

FIG. 8 is a schematic diagram of a procedure for processing a submission queue entry according to an embodiment of the present disclosure, and the above steps can be understood with reference to the processing procedure shown in FIG. 8. As shown in FIG. 8, firstly submitting a queue entry (shown as sqe in the figure) for scheduling, and then performing hash calculation based on an nsid and a sqeid of the submission queue entry, in which the nsid is an identifier (equivalent to a unit identification of a target virtual machine unit in the present embodiment) accessed by a controller to a namespace; sqeid is a sending queue element id which is globally unique (equivalent to an entry identification of a submission queue entry in the present embodiment). Then reading a hash bucket corresponding to the hash table and a hash slot corresponding to the difference value, and then determining whether the hash bucket is full. If so, temporarily store it in the bucket and then apply for it subsequently. If not full, read a position of corresponding bitmap data (bitmap), search for a gap, and fill the position of the bitmap data and a corresponding key into a hash slot of a hash bucket corresponding to the hash table.

In the steps of this embodiment, a target logical address is determined by combining bitmap data, and the target logical address is stored in a corresponding hash slot in a hash bucket. The mapping construction of the first hash value and the target logical address is realized, and then the allocation of the logical address of the submission queue entry corresponding to the first request is realized. Since the bitmap data has a smaller volume, the target logical address is calculated twice based on the index corresponding to the target binary numeral provided by the bitmap data. Therefore, it is unnecessary to store the location information of the logical address in the bitmap data, and the occupation of the storage space is further reduced, improving the allocation efficiency of a logical address.

Figure 9:
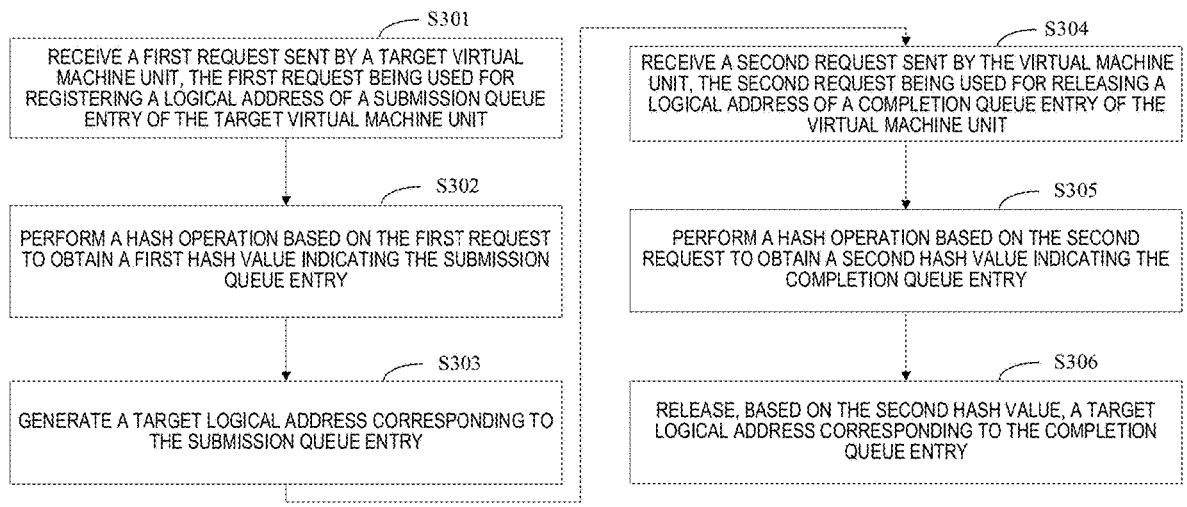
FIG. 9 is a third schematic flowchart of a method for allocating a logical address according to an embodiment of the present disclosure.

FIG. 9 is a third schematic flowchart of a logical address allocation method according to an embodiment of the present disclosure. On the basis of the embodiment shown in FIG. 2, the embodiment adds a step of responding to a second request sent by a target virtual machine unit. The logical address allocation method includes:

Step S301: receiving a first request sent by a target virtual machine unit, where the first request is used for registering a logical address of a submission queue entry of the target virtual machine unit.

Step S302: performing a hash operation based on the first request to obtain a first hash value, where the first hash value is used to indicate the submission queue entry.

Step S303: generating a target logical address corresponding to the submission queue entry based on the first hash value.

Step S304: receiving a second request sent by the virtual machine unit, where the second request is used for releasing a logical address of a queue entry of the virtual machine unit.

Step S305: performing a hash operation based on the second request to obtain a second hash value, where the second hash value is used to indicate a completion queue entry.

Step S306: releasing, based on the second hash value, the target logical address corresponding to the queue entry.

By way of example, based on previous introduction to a submission queue and a completion queue, a submission queue entry in the submission queue and a completion queue entry in the completion queue usually appear in pairs. Therefore, with reference to the process of receiving the first request sent by the target virtual machine unit as shown in FIG. 2, similarly, in response to the first request, the distributed processing unit allocates an address to the submission queue entry. After the read/write instruction corresponding to the submission queue entry is executed, a corresponding completion queue entry needs to be generated. Accordingly, the distributed processing unit needs to continue to process the completion queue entry. In this way, the address corresponding to the completion queue entry is released, wherein exemplarily, the completion queue entry in the step of this embodiment and the submission queue entry in the previous step are directed to the same read/write instruction.

Further, exemplarily, similarly, after the execution of the read/write instruction corresponding to the submission queue entry is completed, the virtual machine unit sends a second request to release the logical address for the completion queue entry, and performs a hash operation on the second request to obtain a second hash value indicating the completion queue entry. The specific implementation process is similar to the process of calculating the first hash value in the foregoing embodiment, and is not further described herein. Then, the target hash table is queried by the second hash value to obtain the target hash bucket storing the target logical address, and the content in the target hash bucket is processed, thereby completing the release of the address of the corresponding target logical address.

Figure 10:
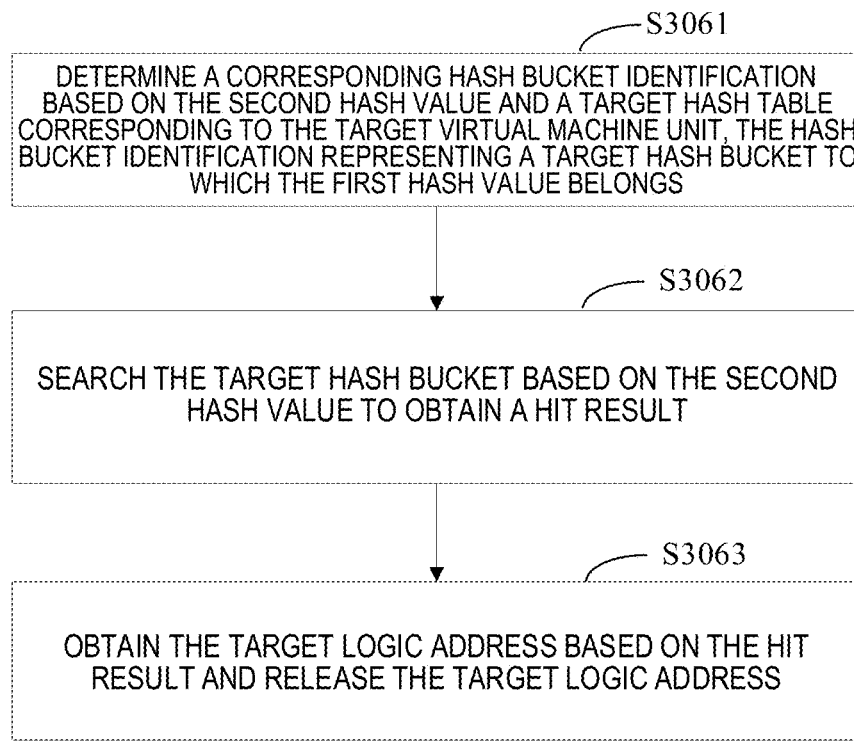
FIG. 10 is a flowchart of a specific implementation of step S306 in the embodiment shown in FIG. 9.

Exemplarily, as shown in FIG. 10, a specific implementation manner of step S306 includes:

Step S3061: determining a corresponding hash bucket identification based on the second hash value and a target hash table corresponding to the target virtual machine unit, the hash bucket identification representing a target hash bucket to which the first hash value belongs.

Step S3062: searching the target hash bucket based on the second hash value to obtain a hit result.

Step S3063: obtaining the target logic address based on the hit result and release the target logic address.

Exemplarily, first, a target hash table corresponding to the target virtual machine unit is acquired, and a query is performed according to the target hash table and the second hash value to obtain a target hash bucket corresponding to the second hash value. In this embodiment, since the completion queue entry and the submission queue entry in the previous step is directed to the same read/write instruction, the second hash value corresponding to the completion queue entry is the same as the first hash value corresponding to the submission queue entry. The method for calculating the second hash value corresponding to the queue entry may refer to the method for calculating the first hash value in the previous embodiment, which will not be described herein again. Then, retrieve a target hash bucket based on the second hash value, and obtain, according to a retrieval result, a hit result indicating whether the second hash value is stored in the target hash bucket. If a hit occurs, that is, the second hash value is stored in the hash slot corresponding to the target hash bucket, the information in the hash slot is read. After the target logical address is obtained, on the one hand, the hash slot is empty, and the second hash value (i.e. the first hash value) stored in the hash slot is deleted. On the other hand, the binary numeral for recording the target logical position in the bitmap data is restored, so as to realize the target logical address.

Figure 11:
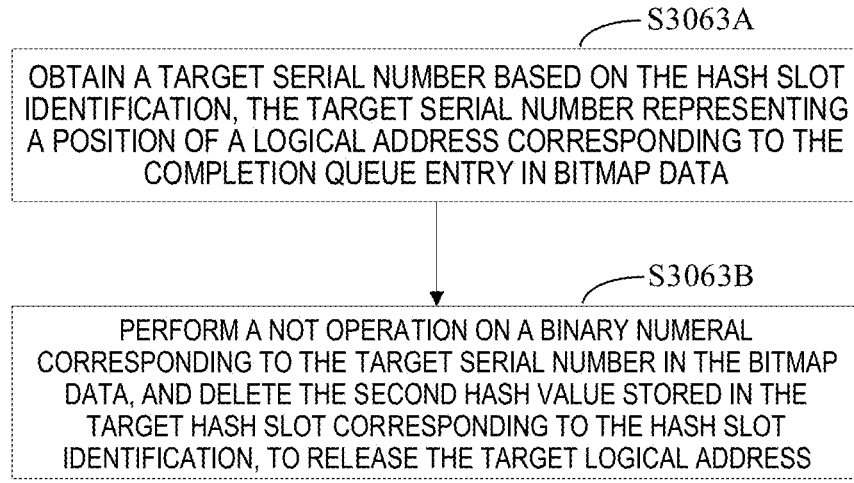
FIG. 11 is a flowchart of a specific implementation of step S3063 in the embodiment shown in FIG. 10.

Exemplarily, a hit result includes a Hash slot identifier, and as shown in FIG. 11, specific implementation steps of step S3063 include:

Step S3063A: obtaining a target serial number based on the hash slot identification, the target serial number representing a position of a logical address corresponding to the completion queue entry in bitmap data.

Step S3063B: performing a NOT operation on a binary numeral corresponding to the target serial number in the bitmap data, and delete the second hash value stored in the target hash slot corresponding to the hash slot identification, to release the target logical address.

Exemplarily, when the second hash value hits a corresponding target hash slot (namely, the second hash value is stored in the target hash slot), return a hit result to the hash slot identifier of the target hash slot, and then read information in the target hash slot based on the hash slot identifier. A target serial number may be obtained, i. e. a hash value and a serial number corresponding to the hash value and representing the position of an occupied logical address in bitmap data are stored in a hash slot, i.e., the target serial number. The hash value and the serial number stored in the target hash slot hit by the second hash value are the first hash value written into the target hash slot in response to the first request and the corresponding target serial number in the step of the above embodiment. For details, reference may be made to the description of relevant steps in the embodiments shown in FIGS. 2 and 5, and details are not repeatedly described herein.

Afterwards, on the one hand, the position of the binary numeral in the bitmap data corresponding to the target virtual machine unit is reversely positioned by taking the target serial number as a bit numeral coordinate (for example, 5). The binary number at the position is set as the target binary numeral in the previous step because the submission queue entry is assigned an address. For example, the value is set to 1, and in this case, a NON-operation is performed on the binary numeral at the position (namely, 0 is set to 1, and 1 is set to 0). Thus, the logical address occupied by the previously submitted queue entry is released. On the other hand, the target hash slot hit by the second hash value is cleared, that is, the second hash value stored in the hash slot is deleted, that is, the first hash value filled when the logical address is allocated to the submission queue entry, thereby realizing the release of the target logical address.

Figure 12:
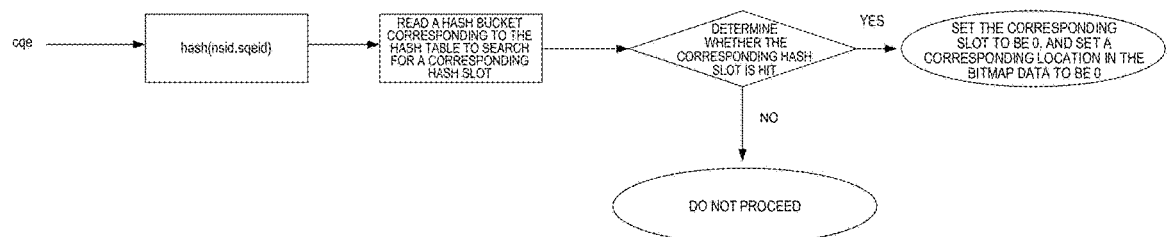
FIG. 12 is a schematic diagram of a procedure of processing a completion queue entry according to an embodiment of the present disclosure.

FIG. 12 is a schematic diagram of a process for processing queue entries according to an embodiment of the present disclosure. As shown in FIG. 12, the above steps may be understood with reference to the processing procedure shown in FIG. 12. as shown in FIG. 12, performing hash calculation based on an Nsid and an Sqeid of a completion queue entry (shown as cqe in the figure), in which the Nsid is an identifier (equivalent to a unit identification of a target virtual machine unit in the present embodiment) accessed by a controller to a namespace; Sqeid is a sending queue element id which is globally unique (equivalent to an entry identification of a completion queue entry in the present embodiment). Then, it is determined whether a corresponding Hash slot is hit, and if yes, the corresponding Hash slot is set to 0, and the position corresponding to bitmap data (bitmap) is set to 0. If no hit occurs, no processing is performed.

In this embodiment, steps S301 to S303 are implemented in a same manner as steps S101 to S103 in the foregoing embodiments. For detailed discussion, refer to the discussion in corresponding steps in the embodiments shown in FIGS. 2 and 5, and details are not described herein again.

Figure 13:
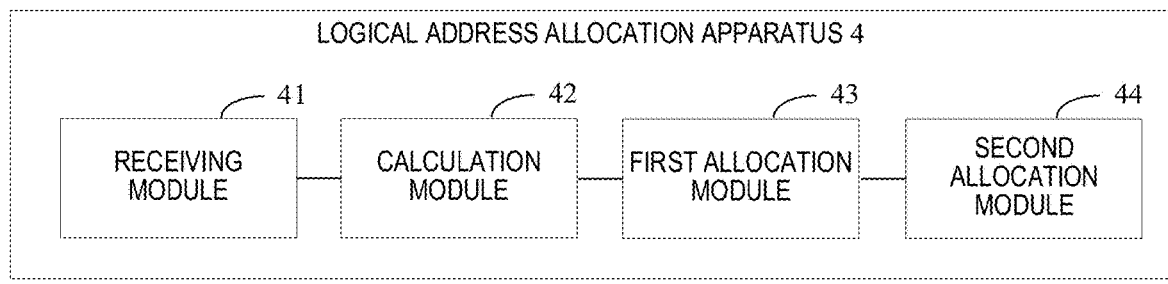
FIG. 13 is a structural block diagram of a logical address allocation apparatus according to an embodiment of the present disclosure.

Corresponding to the logical address allocation method in the foregoing embodiment, FIG. 13 is a structural block diagram of a logical address allocation apparatus according to an embodiment of the present disclosure. For ease of description, only parts related to embodiments of the present disclosure are shown. Referring to FIG. 13, the logical address allocation apparatus 4 includes:

a receiving module 41 configured to receive a first request sent by a target virtual machine unit, where the first request is used for registering a logical address of a submission queue entry of the target virtual machine unit;

a calculation module 42 configured to perform a hash operation based on a first request to obtain a first hash value;

a first allocation module 43 configured to acquire a target hash table corresponding to the target virtual machine unit, and query, based on the first hash value, the target hash table to obtain a target hash bucket to which the first hash value belongs; and a second allocation module 44 configured to obtain, based on the hash bucket identification of the target hash bucket, a target logical address corresponding to the hash bucket identification from currently available logical addresses, and register the target logical address as a corresponding logical address to generate the submission queue entry.

In one embodiment of the present disclosure, the first request comprises a unit identification of the target virtual machine unit and an entry identification of a submission queue entry. The calculation module 42 is specifically used for: combining a unit identification and an entry identification to obtain a first location identification; and based on a target hash algorithm, processing the first location identification to obtain the first hash value.

In an embodiment of the present disclosure, the second allocation module 44 is specifically configured to: acquire bitmap data corresponding to the target virtual machine unit, where the bitmap data is composed of at least two sequentially arranged binary numerals, and the bitmap data represents a set of currently available logical addresses; and acquire, based on the hash bucket identification and the bitmap data, the target logical address corresponding to the hash bucket identification n.

In an embodiment of the present disclosure, when the second allocation module 44 acquires, based on the hash bucket identification and the bitmap data, a target logical address corresponding to the hash bucket identification, the second allocation module 44 is specifically configured to: detect a target serial number of the first target binary numeral in the bitmap data, where the target binary numeral is used to indicate availability of the logical address; and obtain the target logical address according to the target serial number and the Hash bucket identification.

In an embodiment of the present disclosure, the second allocation module 44 is further configured to detect a collision state of the first hash value in the target hash bucket; if a collision state is a first state, write a target serial number into a hash slot corresponding to the first hash value in the target hash bucket, so as to establish a mapping relationship between the first hash value and the target logical address; perform a NOT operation on the binary numeral corresponding to the target serial number in the bitmap data.

In an embodiment of the present disclosure, the second allocation module 44 is further configured to detect a collision state of the first hash value in the target hash bucket; if the collision state is the second state, buffer the first hash value, so that the first hash value and the target logical address establish a mapping relationship after the target duration.

In an embodiment of the present disclosure, the receiving module 41 is further configured to receive a second request sent by the virtual machine unit, the second request being used for releasing a logical address of a queue entry of the virtual machine unit. The calculation module 42 is further configured to perform a hash operation based on the second request to obtain a second hash value, wherein the second hash value is used for indicating a completion queue entry. The second allocation module 44 is further configured to, based on the second hash value, release the target logical address corresponding to the queue entry.

In an embodiment of the present disclosure, when the second allocation module 44 releases, based on the second hash value, the target logical address corresponding to the queue entry, the second allocation module 44 is specifically configured to: determine, based on the second hash value and the target hash table corresponding to the target virtual machine unit, a corresponding hash bucket identification, where the hash bucket identification represents a target hash bucket to which the first hash value belongs; search the target Hash bucket based on the second Hash value to obtain a hit result; and obtain the target logical address based on the hit result, and release the target logical address.

In one embodiment of the present disclosure, the hit result comprises a hash slot identification; when obtaining the target logical address based on the hit result and releasing the target logical address, the allocation module 43 is specifically used for: obtaining the target serial number according to the hash slot identification, the target serial number representing the position of the logical address corresponding to the completion queue entry in the bitmap data; performing a NON-operation on a binary numeral corresponding to the target serial number in the bitmap data, and deleting a second hash value stored in the target hash slot corresponding to the hash slot identification, so as to release the target logic address.

The receiving module 41, the calculation module 42, the first allocation module 43, and the second allocation module 44 are connected in sequence. The logical address allocation apparatus 4 provided in this embodiment may execute the technical solutions of the foregoing method embodiments, implementation principles and technical effects of the apparatus are similar, and details are not repeatedly described herein in this embodiment.

Figure 14:
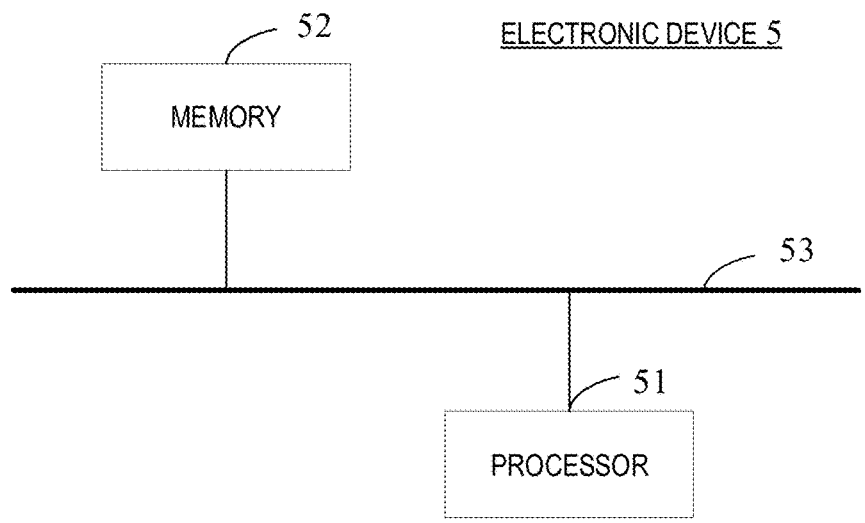
FIG. 14 is a schematic structural diagram of an electronic device according to an embodiment of the present disclosure.

FIG. 14 is a schematic structural diagram of an electronic device according to an embodiment of the present disclosure. As shown in FIG. 14, the electronic device 5 includes:
a processor 51, and a memory 52 in communication connection with the processor 51;
the memory 52 stores a computer execution instruction;
the processor 51 executes a computer execution instruction stored by the memory 52, so as to implement a logical address allocation method in the embodiments shown in FIG. 2 to FIG. 12.

Optionally, the processor 51 and the memory 52 are connected through a bus 53.

The related descriptions can be understood with reference to the related descriptions and effects corresponding to the steps in the embodiments corresponding to FIG. 2 to FIG. 12, and will not be repeated redundantly herein.

Embodiments of the present disclosure provide a computer readable storage medium. The computer readable storage medium stores a computer execution instruction. When the computer execution instruction is executed by a processor, the computer execution instruction is used to implement a logic address allocation method provided by any embodiment in embodiments corresponding to FIG. 2 to FIG. 12 of the present disclosure.

Embodiments of the present disclosure provide a computer program product, comprising a computer program. When being executed by a processor, the computer program implements a logical address allocation method in the embodiments shown in FIG. 2 to FIG. 12.

Figure 15:
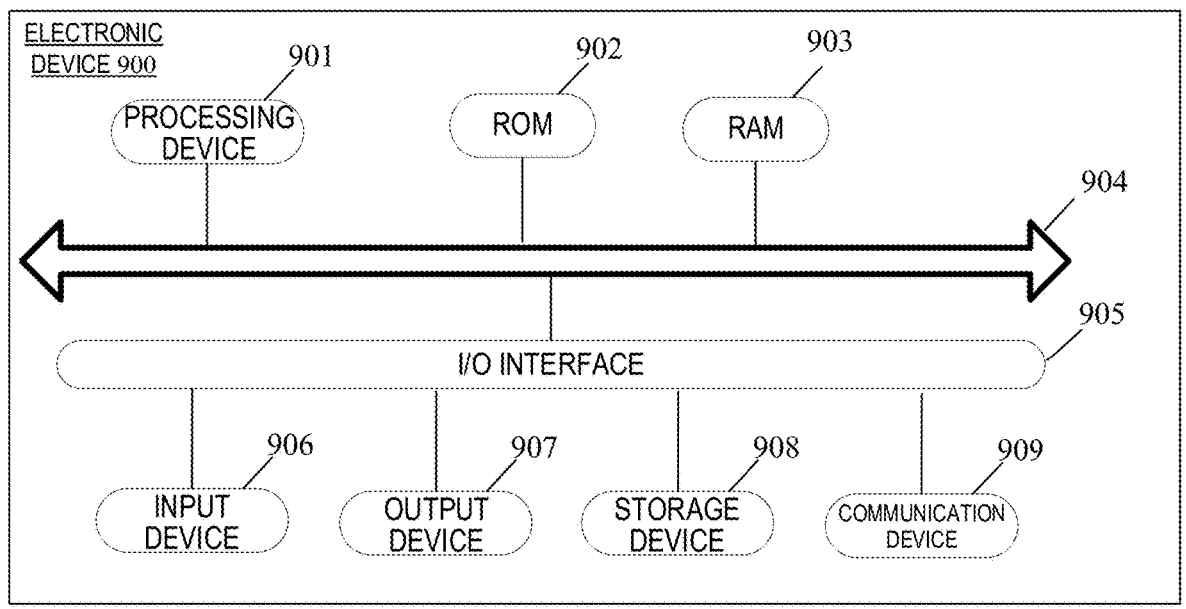
FIG. 15 is a schematic structural diagram of hardware of an electronic device according to an embodiment of the present disclosure.

Referring to FIG. 15, it shows a schematic structural diagram of an electronic device 900 suitable for implementing an embodiment of the present disclosure. The electronic device 900 may be a terminal device or a server. The terminal device may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 15 is merely an example, and should not impose any limitation to the function or the scope of application of the embodiments of the present disclosure.

As shown in FIG. 15, electronic device 900 may include a processing device (such as a central processing unit and a graphics processor) 901, which may execute various appropriate actions and processing according to a program stored in a read-only memory (ROM) 902 or a program loaded to a random access memory (RAM) 903 from a storage device 908. Various programs and data required during operation of the electronic device 900 are also stored in the RAM 903. The processing device 901, the ROM 902 and the RAM 903 are connected with one another via a bus 904. An input/output (I/O) interface 905 is also connected to the bus 904.

Generally, the following apparatuses may be connected to the I/O interface 905: an input device 906 including for example a touch screen, a touch pad, a keyboard, a mouse, a camera, a microphone, an accelerometer and a gyroscope; an output device 907 including for example a liquid crystal display (LCD), a speaker and a vibrator; a storage device 908 including for example a magnetic tape and a hard disk; and a communication device 909. The communication device 909 may allow wireless or wired communication between the electronic device 900 and other devices for data exchange. Although FIG. 15 shows the electronic device 900 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 909, or installed from the storage device 908, or installed from the ROM 902. The computer program, when executed by the processing unit 901, causes the processing unit to execute the above functions defined in the methods according to the embodiments of the present disclosure.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

The computer-readable medium may be included in the electronic device described above; or it may stand alone without being assembled into the electronic device.

The computer readable medium carries one or more programs, and when the one or more programs are executed by the electronic device, the electronic device is enabled to execute the method shown in the foregoing embodiments.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware. In some cases, the names of the modules do not constitute limitations to the modules themselves. For example, the associated page displaying module may also be described as "a module that displays an associated page of a first user in a predetermined application, where the associated page includes an object identifier corresponding to at least one object, the first user is an author of the at least one object, and the object is used for creating a multimedia content".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to a first aspect, according to one or more embodiments of the present disclosure, a logical address allocation method is provided, including:

receiving a first request sent by a target virtual machine unit, the first request being used for registering a logical address of a submission queue entry of the target virtual machine unit; performing a hash operation based on the first request to obtain a first hash value indicating the submission queue entry; acquiring a target hash table corresponding to the target virtual machine unit, and querying the target hash table based on the first hash value to obtain a target hash bucket to which the first hash value belongs; acquiring, based on a hash bucket identification of the target hash bucket, a target logical address corresponding to the hash bucket identification from currently available logical addresses; and registering the target logical address as a corresponding logical address to generate the submission queue entry.

According to one or more embodiments of the present disclosure, the first request comprises a unit identification of the target virtual machine unit and an entry identification of the submission queue entry, and performing a hash operation based on the first request to obtain a first hash value comprises: combining the unit identification and the entry identification to obtain a first location identification; processing the first location identification based on a target hash algorithm to obtain the first hash value.

According to one or more embodiments of the present disclosure, the acquiring, based on the hash bucket identification of the target hash bucket, a target logical address corresponding to the hash bucket identification from currently available logical addresses comprises: acquiring bitmap data corresponding to the target virtual machine unit, wherein the bitmap data is composed of at least two sequentially arranged binary numerals, and the bitmap data represents a set of currently available logical addresses; acquiring, based on the hash bucket identification and the bitmap data, the target logical address corresponding to the hash bucket identification.

According to one or more embodiments of the present disclosure, the acquiring, based on the hash bucket identification and the bitmap data, the target logical address corresponding to the hash bucket identification comprises: detecting a target serial number of the first target binary numeral in the bitmap data, the target binary number indicating availability of a logic address; obtaining the target logical address based on the target serial number and the hash bucket identification.

According to one or more embodiments of the present disclosure, the method further comprises: detecting a collision state of the first hash value in the target hash bucket; in response to the collision state being a first state, writing the target serial number into a hash slot corresponding to the first hash value in the target hash bucket, so that a mapping relationship is established between the first hash value and the target logical address; performing a NOT operation on a binary numeral corresponding to the target serial number in the bitmap data.

According to one or more embodiments of the present disclosure, the method further comprises: detecting a collision state of the first hash value in the target hash bucket; in response to the collision state being a second state, buffering the first hash value, so that a mapping relationship between the first hash value and the target logical address is established after a target duration.

According to one or more embodiments of the present disclosure, the method further comprises: receiving a second request sent by the virtual machine unit, the second request being used for releasing a logical address of a completion queue entry of the virtual machine unit; performing a hash operation based on the second request to obtain a second hash value indicating the completion queue entry; releasing, based on the second hash value, a target logical address corresponding to the completion queue entry.

According to one or more embodiments of the present disclosure, determining a corresponding hash bucket identification based on the second hash value and a target hash table corresponding to the target virtual machine unit, the hash bucket identification representing a target hash bucket to which the first hash value belongs; searching the target hash bucket based on the second hash value to obtain a hit result; obtaining the target logic address based on the hit result and releasing the target logic address.

According to one or more embodiments of the present disclosure, the hit result comprises a hash slot identification, and obtaining the target logical address based on the hit result and releasing the target logical address comprises: obtaining a target serial number based on the hash slot identification, the target serial number representing a position of a logical address corresponding to the completion queue entry in bitmap data; performing a NOT operation on a binary numeral corresponding to the target serial number in the bitmap data, and deleting the second hash value stored in the target hash slot corresponding to the hash slot identification, to release the target logical address.

According to a second aspect, in one or more embodiments of the present disclosure, a logical address allocation apparatus is provided, including:
  a receiving module configured to receive a first request sent by a target virtual machine unit, the first request being used for registering a logical address of a submission queue entry of the target virtual machine unit;
  a calculation module configured to perform a hash operation based on the first request to obtain a first hash value;
  a first allocation module configured to acquire a target hash table corresponding to the target virtual machine unit, and query the target hash table based on the first hash value to obtain a target hash bucket to which the first hash value belongs; and
  a second allocation module configured to acquire, based on a hash bucket identification of the target hash bucket, a target logical address corresponding to the hash bucket identification from currently available logical addresses, and register the target logical address as a corresponding logical address to generate the submission queue entry.

According to one or more embodiments of the present disclosure, the first request comprises unit identification of the target virtual machine unit and an entry identification of the submission queue entry; the calculation module is specifically used for: combining the unit identification and the entry identification to obtain a first location identification; processing the first location identification based on a target hash algorithm to obtain the first hash value.

According to one or more embodiments of the present disclosure, the second allocation module is specifically configured for: acquiring bitmap data corresponding to the target virtual machine unit, wherein the bitmap data is composed of at least two sequentially arranged binary numerals, and the bitmap data represents a set of currently available logical addresses; acquiring, based on the hash bucket identification and the bitmap data, the target logical address corresponding to the hash bucket identification.

According to one or more embodiments of the present disclosure, when the second allocation module obtains, according to the hash bucket identification and the bitmap data, a target logical address corresponding to the hash bucket identification, the second allocation module is specifically configured for: detecting a target serial number of the first target binary numeral in the bitmap data, the target binary number indicating availability of a logic address; obtaining the target logical address based on the target serial number and the hash bucket identification.

According to one or more embodiments of the present disclosure, the second allocation module is further configured for: detecting a collision state of the first hash value in the target hash bucket; in response to the collision state being a first state, writing the target serial number into a hash slot corresponding to the first hash value in the target hash bucket, so that a mapping relationship is established between the first hash value and the target logical address; performing a NOT operation on a binary numeral corresponding to the target serial number in the bitmap data.

According to one or more embodiments of the present disclosure, the second allocation module is further configured for: detecting a collision state of the first hash value in the target hash bucket; in response to the collision state being a second state, buffering the first hash value, so that a mapping relationship between the first hash value and the target logical address is established after a target duration.

According to one or more embodiments of the present disclosure, the receiving module is further configured to a second request sent by the virtual machine unit, the second request being used for releasing a logical address of a completion queue entry of the virtual machine unit; the calculation module is further configured to perform a hash operation based on the second request to obtain a second hash value indicating the completion queue entry; the second allocating module is further configured to release, based on the second hash value, a target logical address corresponding to the completion queue entry.

According to one or more embodiments of the present disclosure, when the second allocation module releases, based on the second hash value, the target logical address corresponding to the queue entry, the second allocating module is specifically configured for: determining a corresponding hash bucket identification based on the second hash value and a target hash table corresponding to the target virtual machine unit, the hash bucket identification representing a target hash bucket to which the first hash value belongs; searching the target hash bucket based on the second hash value to obtain a hit result; obtaining the target logic address based on the hit result and releasing the target logic address.

According to one or more embodiments of the present disclosure, a hit result comprises a hash slot identification; when obtaining a target logical address according to the hit result and releasing the target logical address, the allocation module is specifically used for: obtaining a target serial number based on the hash slot identification, the target serial number representing a position of a logical address corresponding to the completion queue entry in bitmap data; performing a NOT operation on a binary numeral corresponding to the target serial number in the bitmap data, and deleting the second hash value stored in the target hash slot corresponding to the hash slot identification, to release the target logical address.

According to a third aspect, according to one or more embodiments of the present disclosure, there is provided an electronic device, comprising: a processor and a memory in communication connection with the processor;

the memory stores a computer execution instruction;
the processor executes the computer execution instruction stored in the memory, so as to implement the logical address allocation method described in the foregoing first aspect and various possible designs in the first aspect.

According to a fourth aspect, according to one or more embodiments of the present disclosure, a computer readable storage medium is provided. The computer readable storage medium stores a computer execution instruction. When a processor executes the computer execution instruction, the logical address allocation method according to the first aspect and various possible designs of the first aspect is implemented.

According to a fifth aspect, an embodiment of the present disclosure provides a computer program product, including a computer program. When being executed by a processor, the computer program implements the logical address allocation method according to the foregoing first aspect and various possible designs of the first aspect.

The foregoing description is merely illustrative of the preferred embodiments of the present disclosure and of the technical principles applied thereto, as will be appreciated by those skilled in the art. The disclosure of the present disclosure is not limited to the technical solution formed by the specific combination of the described technical features. At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for logical address allocation, comprising:
receiving a first request sent by a target virtual machine unit, the first request being used for registering a logical address of a submission queue entry of the target virtual machine unit;
performing a hash operation based on the first request to obtain a first hash value indicating the submission queue entry;
acquiring a target hash table corresponding to the target virtual machine unit, and querying the target hash table based on the first hash value to obtain a target hash bucket to which the first hash value belongs;
acquiring, based on a hash bucket identification of the target hash bucket, a target logical address corresponding to the hash bucket identification from currently available logical addresses; and
registering the target logical address as a corresponding logical address to generate the submission queue entry,
wherein the first request comprises a unit identification of the target virtual machine unit and an entry identification of the submission queue entry, and performing the hash operation based on the first request to obtain the first hash value comprises:
combining the unit identification and the entry identification to obtain a first location identification; and
processing the first location identification based on a target hash algorithm to obtain the first hash value.

2. The method of claim 1, wherein the acquiring, based on the hash bucket identification of the target hash bucket, a target logical address corresponding to the hash bucket identification from currently available logical addresses comprises:
acquiring bitmap data corresponding to the target virtual machine unit, wherein the bitmap data is composed of at least two sequentially arranged binary numerals, and the bitmap data represents a set of currently available logical addresses; and
acquiring, based on the hash bucket identification and the bitmap data, the target logical address corresponding to the hash bucket identification.

3. The method of claim 2, wherein the acquiring, based on the hash bucket identification and the bitmap data, the target logical address corresponding to the hash bucket identification comprises:
detecting a target serial number of the first target binary numeral in the bitmap data, the target binary number indicating availability of a logic address; and
obtaining the target logical address based on the target serial number and the hash bucket identification.

4. The method of claim 3, further comprising:
detecting a collision state of the first hash value in the target hash bucket;

in response to the collision state being a first state, writing the target serial number into a hash slot corresponding to the first hash value in the target hash bucket, so that a mapping relationship is established between the first hash value and the target logical address; and performing a NOT operation on a binary numeral corresponding to the target serial number in the bitmap data.

5. The method of claim 3, further comprising:

detecting a collision state of the first hash value in the target hash bucket; and in response to the collision state being a second state, buffering the first hash value, so that a mapping relationship between the first hash value and the target logical address is established after a target duration.

6. The method of claim 1, further comprising:

receiving a second request sent by the virtual machine unit, the second request being used for releasing a logical address of a completion queue entry of the virtual machine unit;

performing a hash operation based on the second request to obtain a second hash value indicating the completion queue entry; and releasing, based on the second hash value, a target logical address corresponding to the completion queue entry.

7. The method of claim 6, wherein the releasing, based on the second hash value, a target logical address corresponding to the queue completion entry comprises:

determining a corresponding hash bucket identification based on the second hash value and a target hash table corresponding to the target virtual machine unit, the hash bucket identification representing a target hash bucket to which the first hash value belongs;

searching the target hash bucket based on the second hash value to obtain a hit result; and obtaining the target logic address based on the hit result and releasing the target logic address.

8. The method of claim 7, wherein the hit result comprises a hash slot identification, and obtaining the target logical address based on the hit result and releasing the target logical address comprises:

obtaining a target serial number based on the hash slot identification, the target serial number representing a position of a logical address corresponding to the completion queue entry in bitmap data; and performing a NOT operation on a binary numeral corresponding to the target serial number in the bitmap data, and deleting the second hash value stored in the target hash slot corresponding to the hash slot identification, to release the target logical address.

9. An electronic device, comprising: a processor, and a memory that communicatively connects with the processor;

the memory stores computer execution instructions;

the processor executes the computer execution instructions stored in the memory to implement a method for logical address allocation, the method comprising:

receiving a first request sent by a target virtual machine unit, the first request being used for registering a logical address of a submission queue entry of the target virtual machine unit;

performing a hash operation based on the first request to obtain a first hash value indicating the submission queue entry;

acquiring a target hash table corresponding to the target virtual machine unit, and querying the target hash table based on the first hash value to obtain a target hash bucket to which the first hash value belongs;

acquiring, based on a hash bucket identification of the target hash bucket, a target logical address corresponding to the hash bucket identification from currently available logical addresses; and registering the target logical address as a corresponding logical address to generate the submission queue entry, wherein the first request comprises a unit identification of the target virtual machine unit and an entry identification of the submission queue entry, and performing the hash operation based on the first request to obtain the first hash value comprises:

combining the unit identification and the entry identification to obtain a first location identification; and processing the first location identification based on a target hash algorithm to obtain the first hash value.

10. The electronic device of claim 9, wherein the acquiring, based on the hash bucket identification of the target hash bucket, a target logical address corresponding to the hash bucket identification from currently available logical addresses comprises:

acquiring bitmap data corresponding to the target virtual machine unit, wherein the bitmap data is composed of at least two sequentially arranged binary numerals, and the bitmap data represents a set of currently available logical addresses; and acquiring, based on the hash bucket identification and the bitmap data, the target logical address corresponding to the hash bucket identification.

11. The electronic device of claim 10, wherein the acquiring, based on the hash bucket identification and the bitmap data, the target logical address corresponding to the hash bucket identification comprises:

detecting a target serial number of the first target binary numeral in the bitmap data, the target binary number indicating availability of a logic address; and obtaining the target logical address based on the target serial number and the hash bucket identification.

12. The electronic device of claim 11, wherein the method further comprises:

detecting a collision state of the first hash value in the target hash bucket;

in response to the collision state being a first state, writing the target serial number into a hash slot corresponding to the first hash value in the target hash bucket, so that a mapping relationship is established between the first hash value and the target logical address; and performing a NOT operation on a binary numeral corresponding to the target serial number in the bitmap data.

13. The electronic device of claim 11, wherein the method further comprises:

detecting a collision state of the first hash value in the target hash bucket; and in response to the collision state being a second state, buffering the first hash value, so that a mapping relationship between the first hash value and the target logical address is established after a target duration.

14. The electronic device of claim 9, wherein the method further comprises:

receiving a second request sent by the virtual machine unit, the second request being used for releasing a logical address of a completion queue entry of the virtual machine unit;

performing a hash operation based on the second request to obtain a second hash value indicating the completion queue entry; and releasing, based on the second hash value, a target logical address corresponding to the completion queue entry.

15. The electronic device of claim 14, wherein the releasing, based on the second hash value, the target logical address corresponding to the queue completion entry comprises:
- determining a corresponding hash bucket identification based on the second hash value and a target hash table corresponding to the target virtual machine unit, the hash bucket identification representing a target hash bucket to which the first hash value belongs;
- searching the target hash bucket based on the second hash value to obtain a hit result; and
- obtaining the target logic address based on the hit result and releasing the target logic address.

16. The electronic device of claim 15, wherein the hit result comprises a hash slot identification, and obtaining the target logical address based on the hit result and releasing the target logical address comprises:
- obtaining a target serial number based on the hash slot identification, the target serial number representing a position of a logical address corresponding to the completion queue entry in bitmap data; and
- performing a NOT operation on a binary numeral corresponding to the target serial number in the bitmap data, and deleting the second hash value stored in the target hash slot corresponding to the hash slot identification, to release the target logical address.

17. A non-transitory computer readable storage medium, wherein the computer readable storage medium stores computer execution instructions, and when a processor executes the computer execution instructions, implementing a method for logical address allocation, the method comprising:
- receiving a first request sent by a target virtual machine unit, the first request being used for registering a logical address of a submission queue entry of the target virtual machine unit;
- performing a hash operation based on the first request to obtain a first hash value indicating the submission queue entry;
- acquiring a target hash table corresponding to the target virtual machine unit, and querying the target hash table based on the first hash value to obtain a target hash bucket to which the first hash value belongs;
- acquiring, based on a hash bucket identification of the target hash bucket, a target logical address corresponding to the hash bucket identification from currently available logical addresses; and
- registering the target logical address as a corresponding logical address to generate the submission queue entry,
- wherein the first request comprises a unit identification of the target virtual machine unit and an entry identification of the submission queue entry, and performing the hash operation based on the first request to obtain the first hash value comprises:
  - combining the unit identification and the entry identification to obtain a first location identification; and
  - processing the first location identification based on a target hash algorithm to obtain the first hash value.

18. The computer readable storage medium of claim 17, wherein the method further comprises:
- receiving a second request sent by the virtual machine unit, the second request being used for releasing a logical address of a completion queue entry of the virtual machine unit;
- performing a hash operation based on the second request to obtain a second hash value indicating the completion queue entry; and
- releasing, based on the second hash value, a target logical address corresponding to the completion queue entry.

* * * * *